(12) United States Patent
Katayama et al.

(10) Patent No.: US 11,508,950 B2
(45) Date of Patent: Nov. 22, 2022

(54) ELECTRODE SHEET MANUFACTURING METHOD AND ELECTRODE SHEET MANUFACTURING APPARATUS

(71) Applicants: Toray Engineering Co., Ltd., Tokyo (JP); HONDA MOTOR CO., LTD., Tokyo (JP)

(72) Inventors: Keisuke Katayama, Numazu (JP); Takuto Hayakawa, Numazu (JP); Yusuke Wada, Wako (JP); Masami Kurimoto, Wako (JP)

(73) Assignees: TORAY ENGINEERING CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 190 days.

(21) Appl. No.: 16/460,716

(22) Filed: Jul. 2, 2019

(65) Prior Publication Data

US 2020/0014017 A1 Jan. 9, 2020

(30) Foreign Application Priority Data

Jul. 4, 2018 (JP) .............................. JP2018-127362

(51) Int. Cl.
*H01M 4/04* (2006.01)
*H01M 4/88* (2006.01)
*H01M 8/0271* (2016.01)
*H01M 8/04746* (2016.01)
*H01M 8/04082* (2016.01)

(52) U.S. Cl.
CPC ....... *H01M 4/0409* (2013.01); *H01M 4/8896* (2013.01); *H01M 8/0271* (2013.01); *H01M 8/04201* (2013.01); *H01M 8/04746* (2013.01)

(58) Field of Classification Search
CPC ............ H01M 4/0409; H01M 4/8896; H01M 8/0271; H01M 8/04201; H01M 8/04746
See application file for complete search history.

(56) References Cited

U.S. PATENT DOCUMENTS

| | | | |
|---|---|---|---|
| 2013/0045438 A1* | 2/2013 | Haba ................... | H01M 8/1004 429/535 |
| 2014/0059855 A1* | 3/2014 | Miyazaki .......... | H01M 10/0459 29/874 |

(Continued)

FOREIGN PATENT DOCUMENTS

| | | |
|---|---|---|
| CN | 103227313 | 7/2013 |
| JP | 2008-258097 | 10/2008 |

(Continued)

OTHER PUBLICATIONS

Chinese Office Action dated Nov. 24, 2021, Application No. 2019105931816; English machine translation included; 27 pages.

*Primary Examiner* — Osei K Amponsah
(74) *Attorney, Agent, or Firm* — Rankin, Hill & Clark LLP

(57) ABSTRACT

A method of manufacturing an electrode sheet by using an electrode sheet manufacturing apparatus for manufacturing the electrode sheet includes a feeding step of feeding out a sheet body from a roll on which the sheet body is wound, the sheet body including an active layer containing a catalyst laminated on a support layer, and a cutting step of forming the electrode sheet by punching the sheet body by pressing a cutting blade from a side of the support layer against the sheet body that was fed out in the feeding step.

17 Claims, 10 Drawing Sheets

(56) References Cited

U.S. PATENT DOCUMENTS

2016/0181644 A1\* 6/2016 Ohashi ................ H01M 8/1093
  429/479
2016/0293976 A1  10/2016 Kanai et al.

FOREIGN PATENT DOCUMENTS

| JP | 2010-027227 | 2/2010 |
| JP | 2016-171062 | 9/2016 |
| JP |     6020535 | 10/2016 |

\* cited by examiner

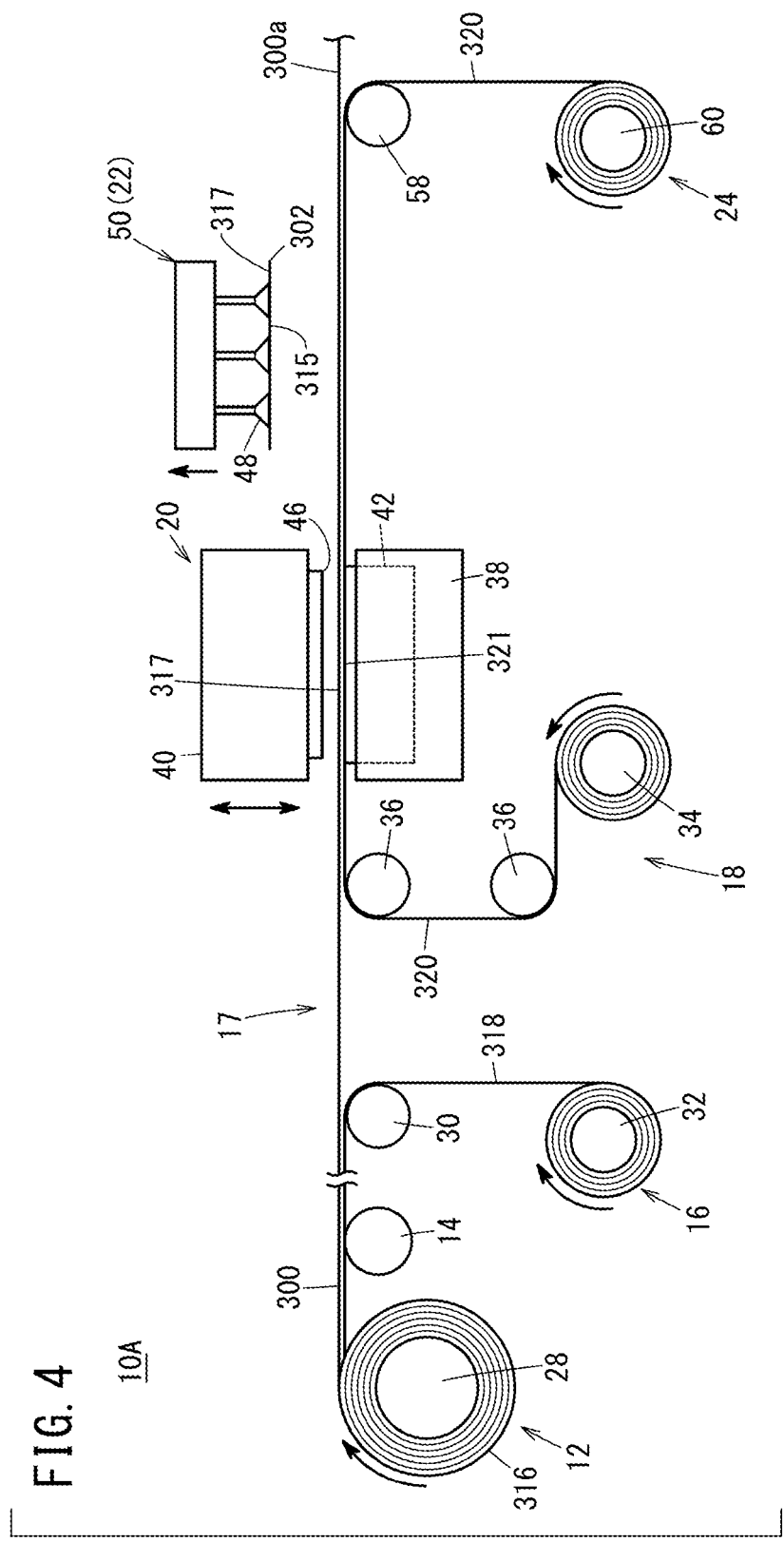

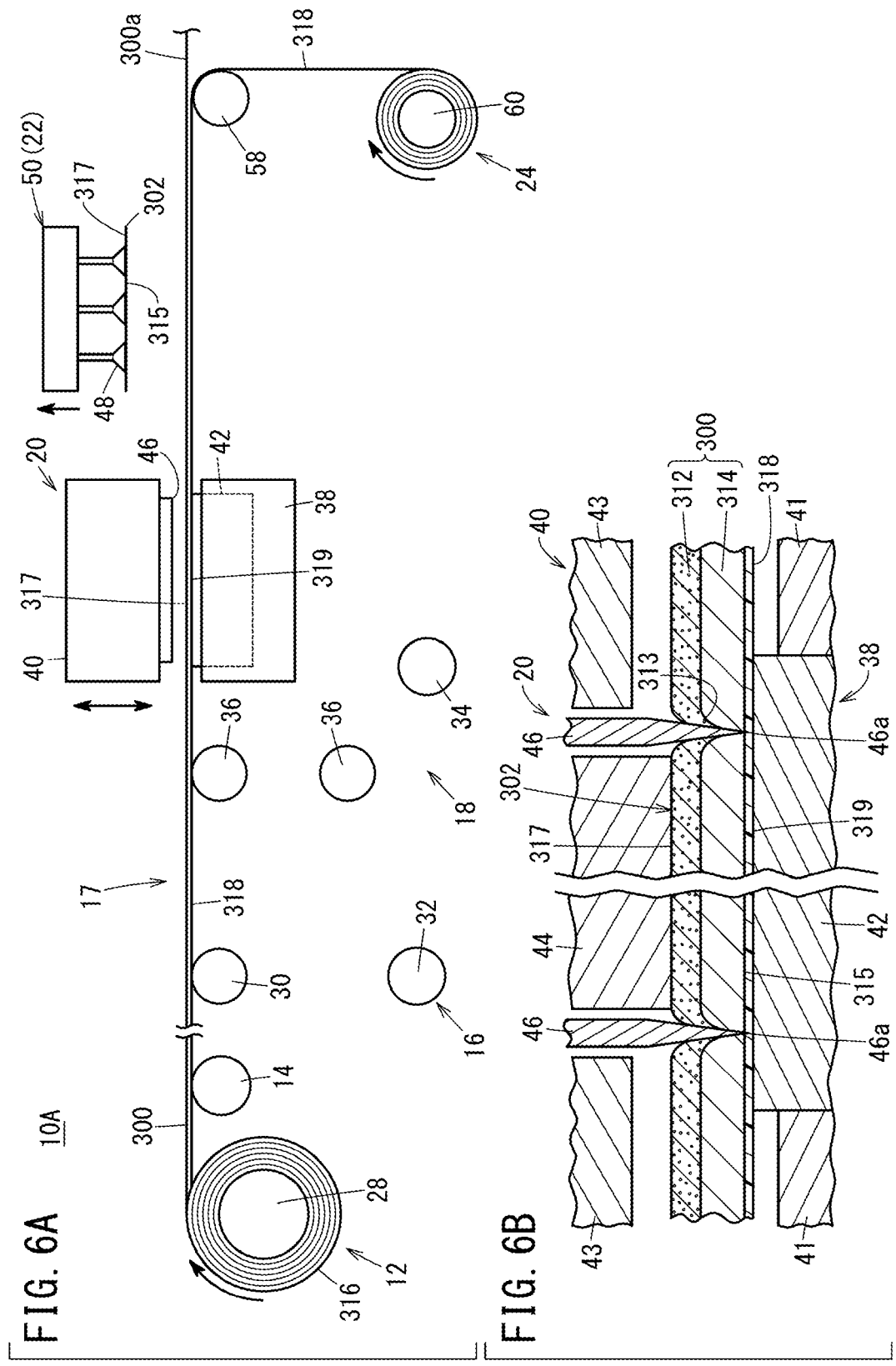

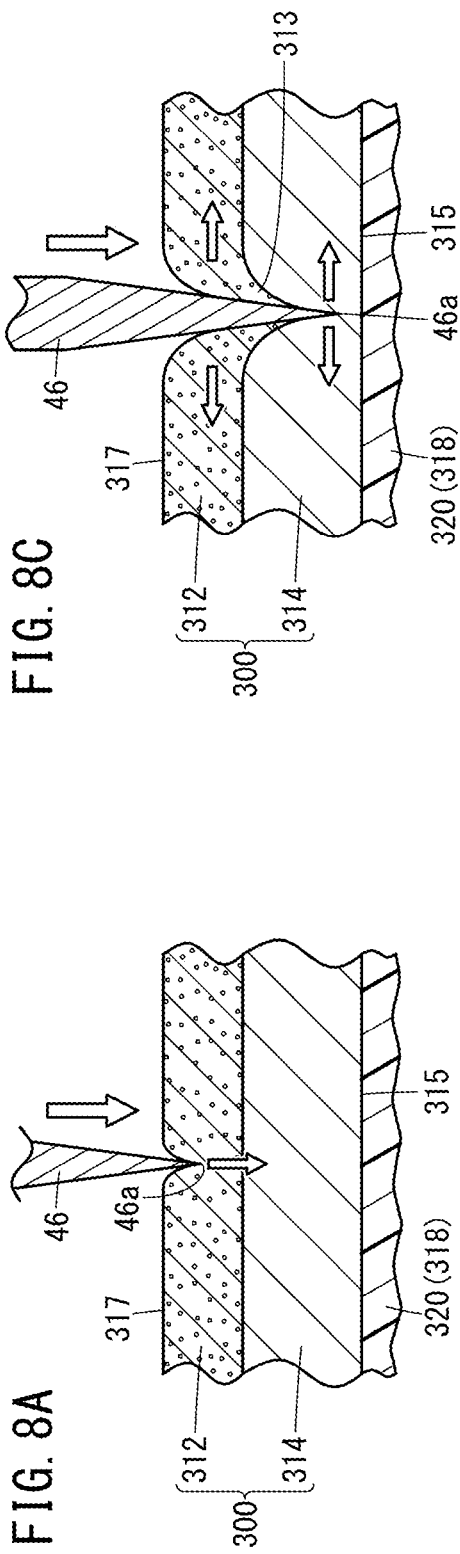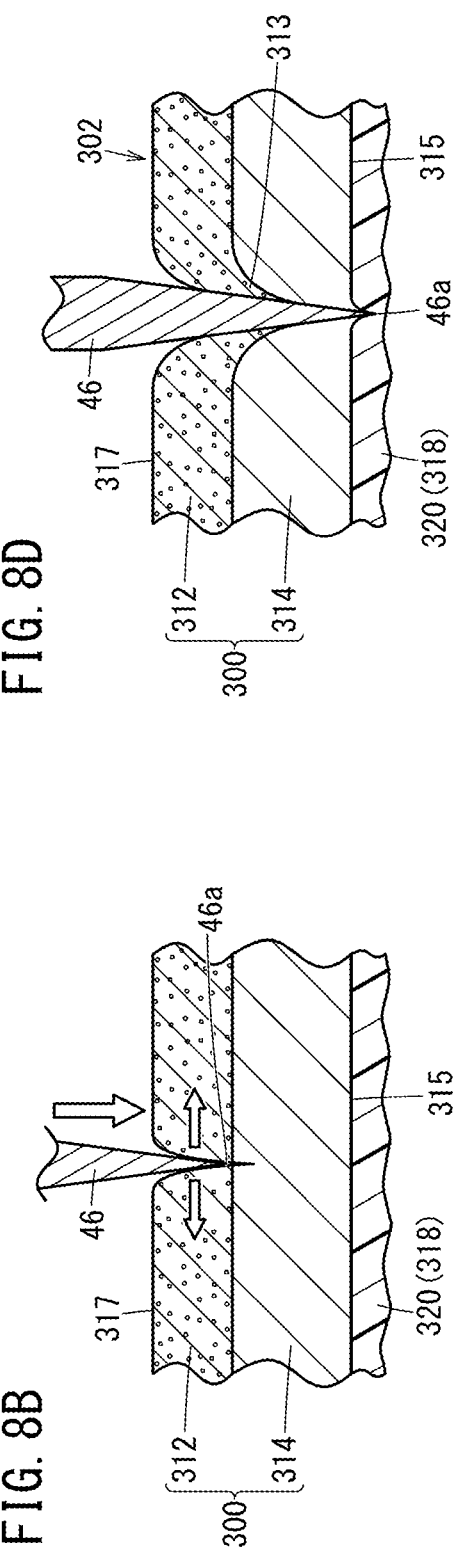

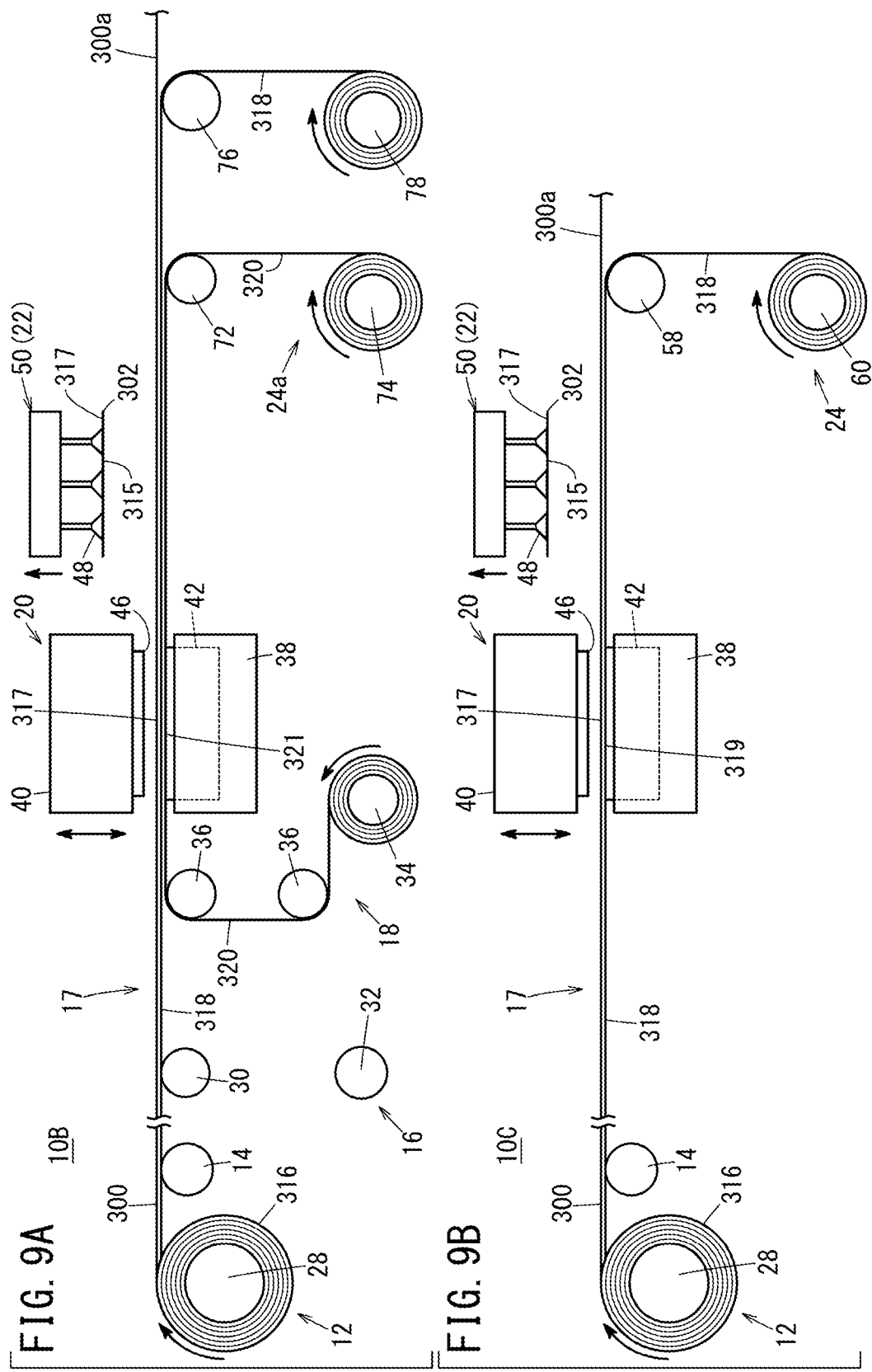

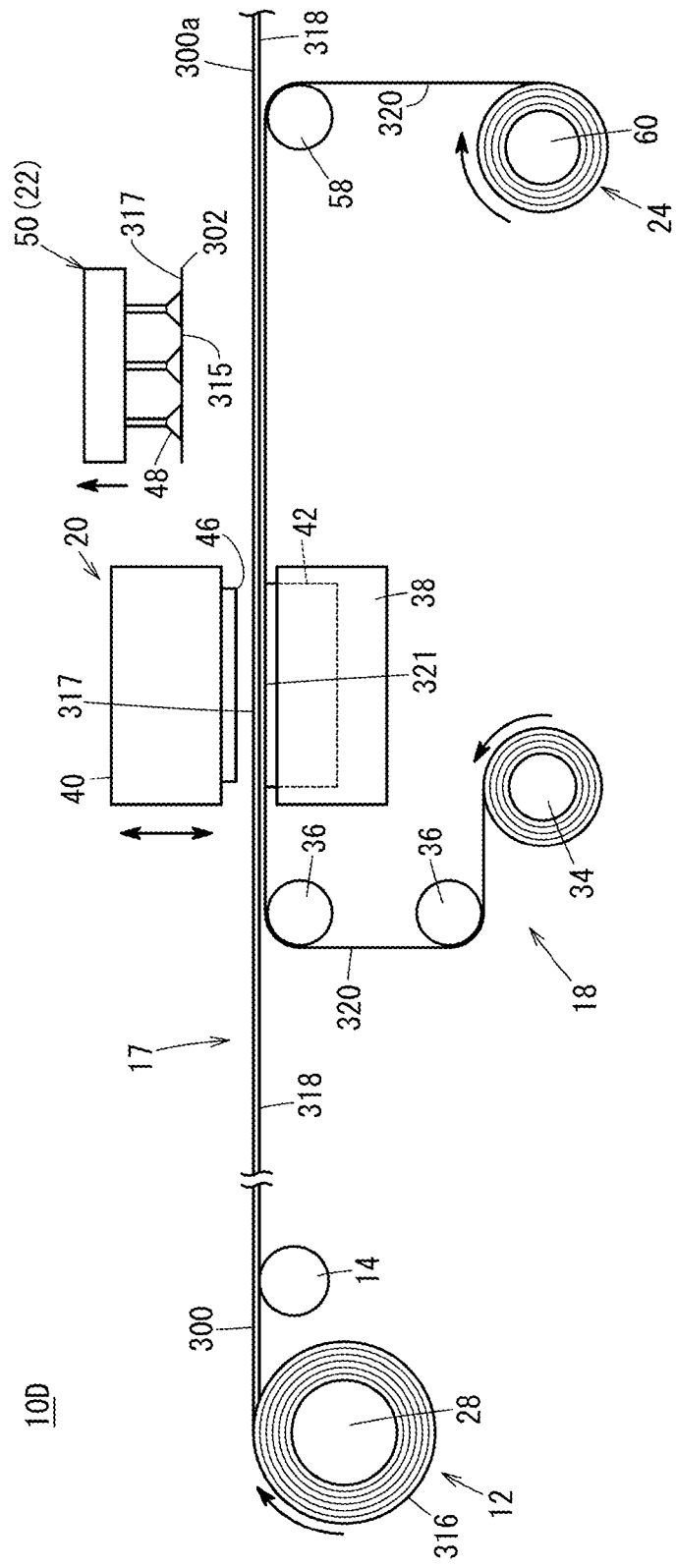

ELECTRODE SHEET MANUFACTURING METHOD AND ELECTRODE SHEET MANUFACTURING APPARATUS

CROSS-REFERENCE TO RELATED APPLICATION

This application is based upon and claims the benefit of priority from Japanese Patent Application No. 2018-127362 filed on Jul. 4, 2018, the contents of which are incorporated herein by reference.

BACKGROUND OF THE INVENTION

Field of the Invention

The present invention relates to a method of manufacturing an electrode sheet and to an apparatus for manufacturing such an electrode sheet which is formed by cutting a sheet body.

Description of the Related Art

A fuel cell includes a membrane electrode assembly (MEA) in which electrode sheets are disposed on both sides of an electrolyte membrane. The electrode sheets are constituted by laminating a catalyst layer on a gas diffusion layer. In manufacturing such a membrane electrode assembly, a method is known in which a gas diffusion layer is formed as a standalone item by cutting the gas diffusion layer, and then the gas diffusion layer is laminated onto a catalyst layer which is disposed on an electrolyte membrane (see, for example, Japanese Laid-Open Patent Publication No. 2008-258097, Japanese Laid-Open Patent Publication 2010-027227, and Japanese Patent No. 6020535).

SUMMARY OF THE INVENTION

Incidentally, in the case of manufacturing an electrode sheet by performing a punching process on a sheet body by pressing a cutting blade against the sheet body in which an active layer (catalyst layer) containing a catalyst is laminated on a support layer (gas diffusion layer), for example, when the cutting blade is pressed from the side of the active layer and the cutting blade is pressed into the active layer, a compressive stress in a thickness direction of the cutting blade (in the planar direction of the sheet body) is generated in the active layer. Therefore, an outer edge of the active layer that constitutes the electrode sheet may become deformed or chipped off. Further, in the event that burrs are generated in the support layer at the time of cutting the sheet body, there is a concern that such burrs may protrude outwardly of the electrode sheet. Furthermore, there is a possibility that the surface of the active layer may become contaminated in a conveying step that takes place after completion of the punching process.

The present invention has been devised taking into consideration the aforementioned problems, and has the object of providing a method of manufacturing an electrode sheet and an electrode sheet manufacturing apparatus, in which it is possible to carry out cutting of the active layer easily and with high quality, wherein even if burrs are generated in the support layer, the burrs can be prevented from protruding outwardly from the electrode sheet, and furthermore, in which it is possible to prevent contamination of the surface of the active layer.

One aspect of the present invention is characterized by a method of manufacturing an electrode sheet, including a feeding step of feeding out a sheet body from a roll on which the sheet body is wound, the sheet body including an active layer containing a catalyst laminated on a support layer, and a cutting step of forming the electrode sheet by punching the sheet body by pressing a cutting blade from a side of the support layer against the sheet body that was fed out in the feeding step.

Another aspect of the present invention is characterized by an electrode sheet manufacturing apparatus, including a sheet body feeding unit configured to feed out a sheet body from a roll on which the sheet body is wound, the sheet body including an active layer containing a catalyst laminated on a support layer, and a cutting device including a cutting blade configured to form the electrode sheet by punching the sheet body that was fed out from the roll by the sheet body feeding unit, wherein, in a state prior to cutting the sheet body, the cutting blade is disposed so as to face an outer surface of the support layer on a side opposite from the active layer.

According to the present invention, since the cutting blade is pressed into the sheet body from the side of the support layer, the cutting blade is pressed into the active layer through the support layer. Therefore, the active layer is placed in a state of being pressed by the support layer. Additionally, when the cutting blade penetrates through the support layer, while the support layer is pressed and spread out in a thickness direction of the cutting blade (in the planar direction of the support layer), the cutting edge of the cutting blade also enters into the active layer. In addition, by further pressing the cutting blade into the sheet body, the support layer becomes separated from the cutting blade, and then accompanying separation of the support layer from the cutting blade, a tensile stress is generated on a portion of the active layer that is pressed by the cutting blade, in a direction that intersects with the pressing direction of the cutting blade. Consequently, since deformation and chipping of the active layer can be suppressed, cutting of the active layer can be performed easily and with high quality. Further, since the cutting blade is pressed from the side of the support layer, even if burrs occur in the support layer at the time of cutting, the burrs can be positioned within the active layer. Thus, even if such burrs occur, the burrs can be prevented from protruding outwardly of the electrode sheet. Furthermore, contamination of the surface of the active layer can be prevented.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is an explanatory diagram of a first driving mode;

FIG. 6A is an explanatory diagram of a second driving mode, and FIG. 6B is a partially omitted cross-sectional view showing a state in which a sheet body is being cut in the second driving mode;

FIG. 8A is a first explanatory diagram of a cutting step, FIG. 8B is a second explanatory diagram of the cutting step, FIG. 8C is a third explanatory diagram of the cutting step, and FIG. 8D is a fourth explanatory diagram of the cutting step;

FIG. 9A is an explanatory diagram of an electrode sheet manufacturing apparatus according to a second embodiment of the present invention, and FIG. 9B is an explanatory diagram of an electrode sheet manufacturing apparatus according to a third embodiment of the present invention; and FIG. 10 is an explanatory diagram of an electrode sheet manufacturing apparatus according to a fourth embodiment of the present invention.

DESCRIPTION OF THE PREFERRED EMBODIMENTS

Hereinafter, preferred embodiments of a method of manufacturing an electrode sheet and an electrode sheet manufacturing apparatus according to the present invention will be presented and described with reference to the accompanying drawings.

First Embodiment

Figure 1:
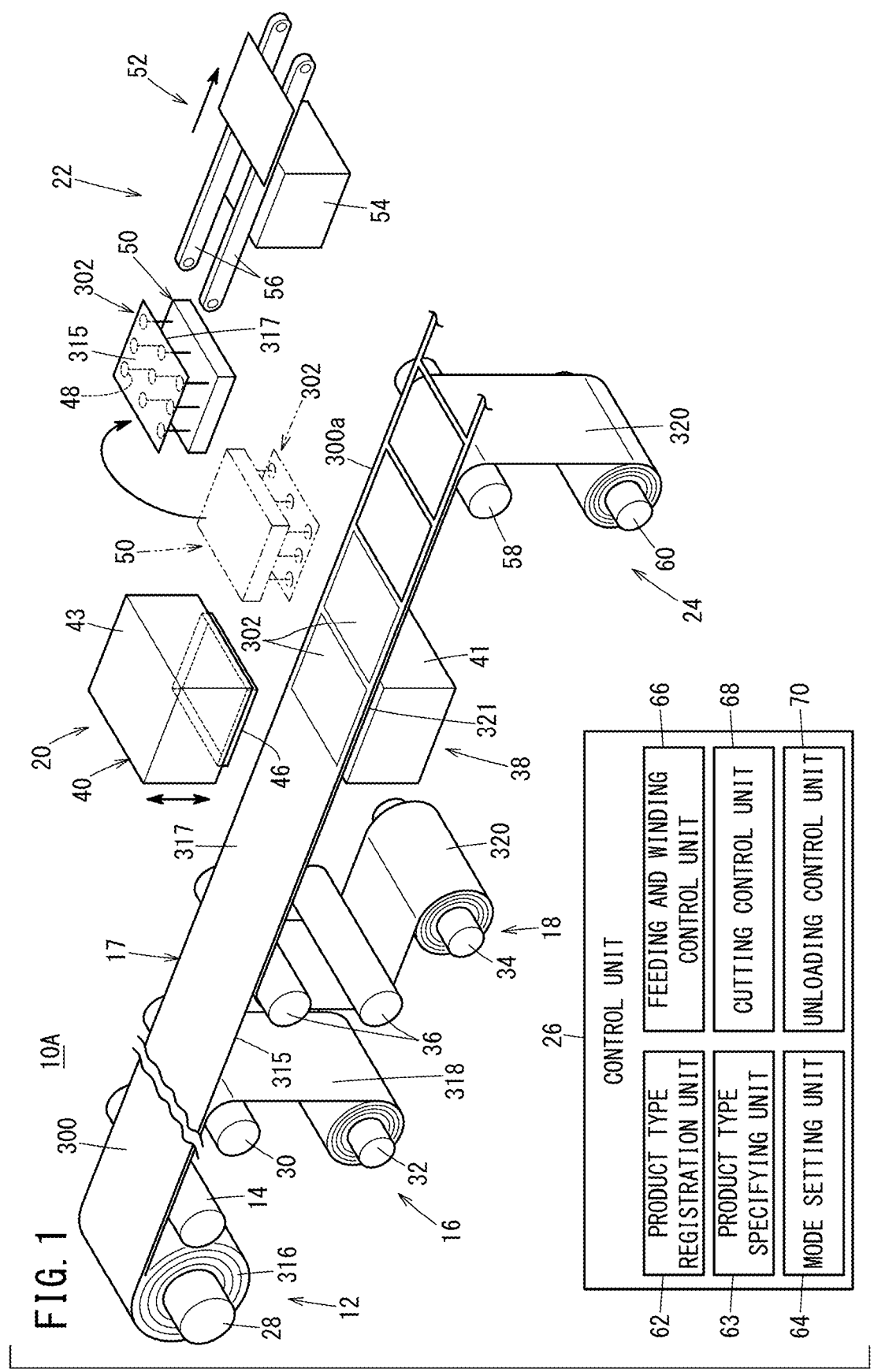
FIG. 1 is a schematic configuration diagram of an electrode sheet manufacturing apparatus according to a first embodiment of the present invention.

As shown in FIG. 1, a manufacturing apparatus 10A for manufacturing an electrode sheet 302 according to the present embodiment forms the electrode sheet 302 for use in a fuel cell 304 (see FIG. 2) by cutting a sheet body 300. However, the manufacturing apparatus 10A is not limited to an example in which the electrode sheet 302 is manufactured for use with the fuel cell 304, and it goes without saying that electrode sheets other than for use with such a fuel cell 304 may be formed.

Figure 2:
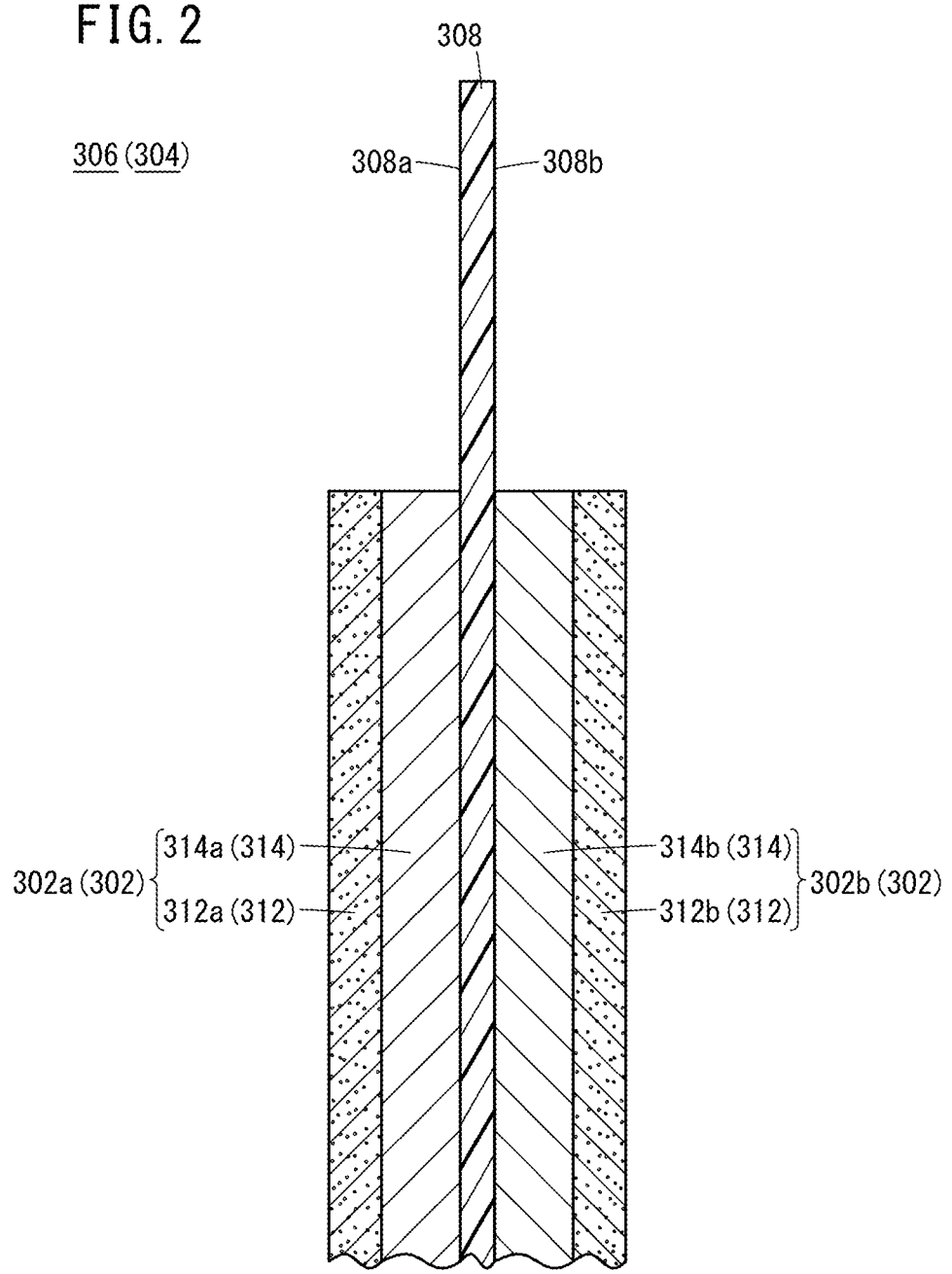
FIG. 2 is a partially omitted cross-sectional view of a membrane electrode assembly of a fuel cell.

First, the electrode sheet 302 for use with the fuel cell 304 will be described. In FIG. 2, for example, a solid polymer electrolyte fuel cell 304 includes a membrane electrode assembly 306. The membrane electrode assembly 306 includes an electrolyte membrane 308, an anode side electrode sheet 302a disposed on one surface 308a of the electrolyte membrane 308, and a cathode side electrode sheet 302b disposed on another surface 308b of the electrolyte membrane 308.

The anode side electrode sheet 302a comprises a support layer 312a and an active layer 314a laminated on the support layer 312a. The support layer 312a is a gas diffusion layer for supplying a hydrogen gas which is an active material on the side of the anode, and is constituted, for example, from carbon paper or carbon cloth. The active layer 314a is formed, for example, by uniformly applying on a surface of the support layer 312a a catalyst paste containing an ion conductive component and porous carbon particles having a catalyst such as platinum or a platinum alloy supported on the surface.

The cathode side electrode sheet 302b comprises a support layer 312b and an active layer 314b laminated on the support layer 312b. The support layer 312b is a gas diffusion layer for supplying oxygen which is an active material on the side of the cathode, and is constituted, for example, from carbon paper or carbon cloth. The active layer 314b is formed, for example, by uniformly applying on a surface of the support layer 312b porous carbon particles having a catalyst such as platinum or a platinum alloy supported on the surface.

The catalyst that is used in the anode side active layer 314a may be the same as or different from the catalyst that is used in the cathode side active layer 314b. In the descriptions given below, in the case that the anode side electrode sheet 302a and the cathode side electrode sheet 302b are not particularly distinguished from each other, they may simply be referred to as "electrode sheets 302", "support layers 312", and "active layers 314".

As shown in FIG. 1, the manufacturing apparatus 10A is equipped with a sheet body feeding unit 12, a conveying roller 14, an upstream side winding unit 16, a back sheet feeding unit 18, a cutting device 20, an unloading device 22, a downstream side winding unit 24, and a control unit 26.

Figure 5A:
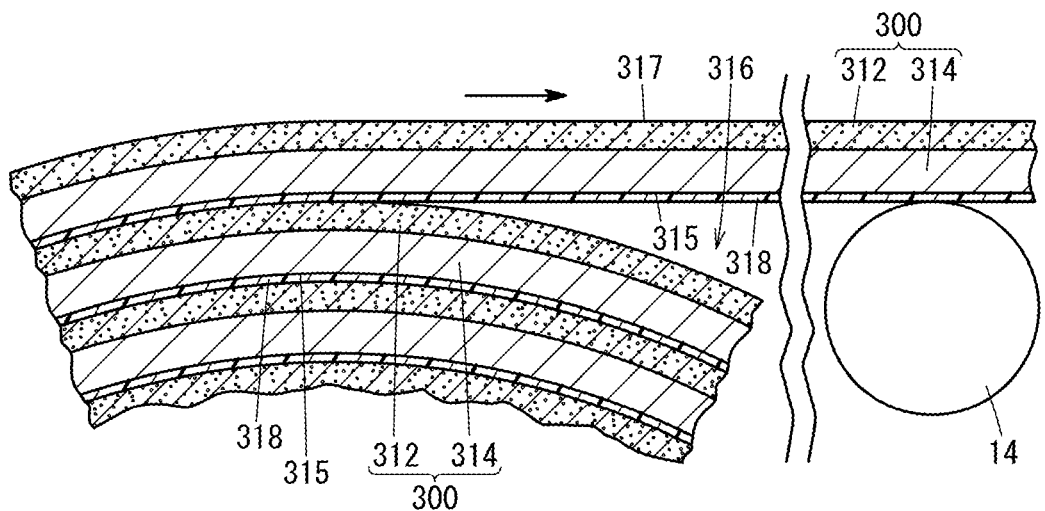
FIG. 5A is a partially omitted longitudinal cross-sectional view of a roll.

In FIG. 1 and FIG. 5A, the sheet body feeding unit 12 feeds the sheet body 300 from a roll 316 on which the sheet body 300, which includes the catalyst containing active layer 314 laminated onto the support layer 312, is wound. The sheet body feeding unit 12 includes a feeding roller 28 (see FIG. 1) on which the sheet body 300 is wound. The roll 316 is formed by winding a protective film 318 and the sheet body 300 in a state with the protective film 318 being disposed on an active surface 315 of the active layer 314 on a side opposite from the support layer 312.

The protective film 318 is an interlayer film which is thinner than the thickness of the sheet body 300. As the constituent material of the protective film 318, there may be cited a resin material such as polypropylene, polyester and the like, and paper.

The conveying roller 14 conveys the sheet body 300 that was fed out from the roll 316 in a state with the protective film 318 being supported in a manner so that the protective film 318 is in contact with the active surface 315.

As shown in FIG. 1, the upstream side winding unit 16 is configured to wind the protective film 318 on an upstream side from the cutting device 20 in a conveyance path 17 of the sheet body 300. The upstream side winding unit 16 includes a peeling roller 30 for peeling the protective film 318 from the sheet body 300, and a winding roller 32 around which the protective film 318 that was peeled by the peeling roller 30 is wound.

The back sheet feeding unit 18 feeds a back sheet 320 to the active surface 315 at a location between the upstream side winding unit 16 (the peeling roller 30) and the cutting device 20 in the conveyance path 17 of the sheet body 300. The back sheet feeding unit 18 includes an unwinding roller 34 on which the back sheet 320 is wound, and lead-out rollers 36 that guide the back sheet 320, which is wound around the unwinding roller 34, to the conveyance path 17 of the sheet body 300.

As the constituent material of the back sheet 320, there may be cited the same constituent materials as used for the protective film 318 described above. The thickness of the back sheet 320 is greater than the thickness of the protective film 318, and less than the thickness of the sheet body 300. However, the thickness of the back sheet 320 may be set arbitrarily.

Figure 5B:
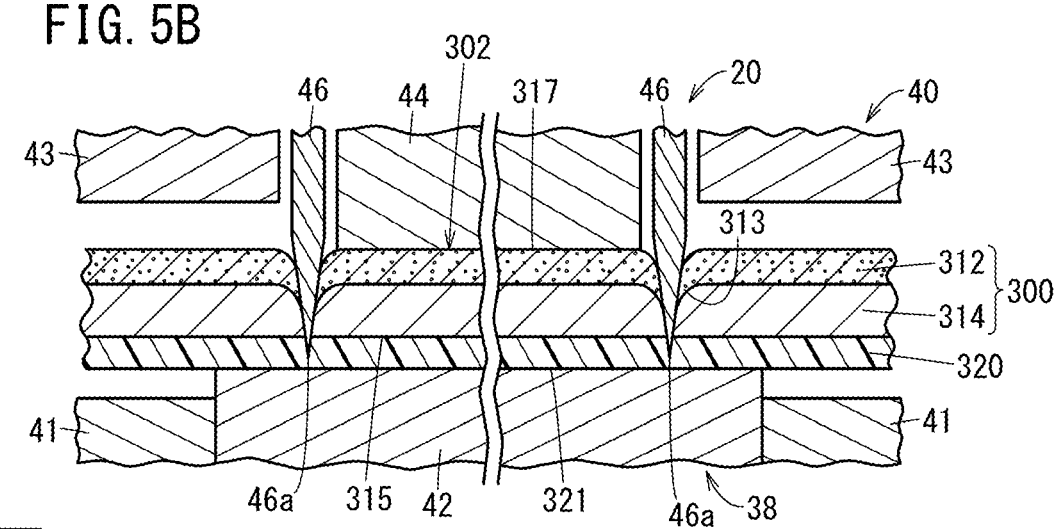
FIG. 5B is a partially omitted cross-sectional view showing a state in which a sheet body is being cut in a first driving mode.

As shown in FIG. 1 and FIG. 5B, the cutting device 20 is a device for performing a punching process on the sheet body 300 that is fed out from the roll 316 by the sheet body feeding unit 12. The cutting device 20 includes a lower die 38, and an upper die 40 disposed face-to-face with the lower die 38 so as to be capable of being brought into close proximity to and spaced away from the lower die 38. The lower die 38 includes a lower die main body 41, and a support base 42 disposed on the lower die main body 41 for supporting the sheet body 300.

The upper die 40 includes an upper die main body 43, a pad 44 disposed on the upper die main body 43 for retaining the sheet body 300 against the support base 42, and a cutting blade 46 for cutting the sheet body 300. The cutting blade 46 is positioned above the support base 42. Stated otherwise, in a state prior to cutting the sheet body 300, the cutting blade 46 is disposed so as to face an outer surface 317 of the support layer 312 on a side opposite from the active layer 314 (see FIG. 1).

The cutting blade 46 is formed in a shape corresponding to the shape of the electrode sheet 302. More specifically, the cutting blade 46 is configured in an annular shape (in the present embodiment, in a rectangular frame shape). The cutting blade 46 is a so-called Thomson blade, and a tip end of the cutting blade 46 is tapered toward a cutting edge 46a thereof. The cutting blade 46 is not limited to being a Thomson blade.

As shown in FIG. 1, the unloading device 22 retains the outer surface 317 of the support layer 312 on the side opposite from the active layer 314, and conveys the electrode sheet 302 out to a subsequent process step. The unloading device 22 is equipped with a suction device 50 having a plurality of suction units 48 (nine in the illustrated example), which are capable of applying suction to the outer surface 317 of the support layer 312, and a conveyor device 52 for unloading or conveying out the electrode sheet 302.

The conveyor device 52 includes a base 54, and a pair of belt units 56 provided on the base 54. The pair of belt units 56 are arranged in parallel in a state of being separated from each other. The respective belt units 56 are set to a size that is capable of being inserted into gaps between the suction units 48 that lie adjacent to each other.

Figures 7A, 7B:
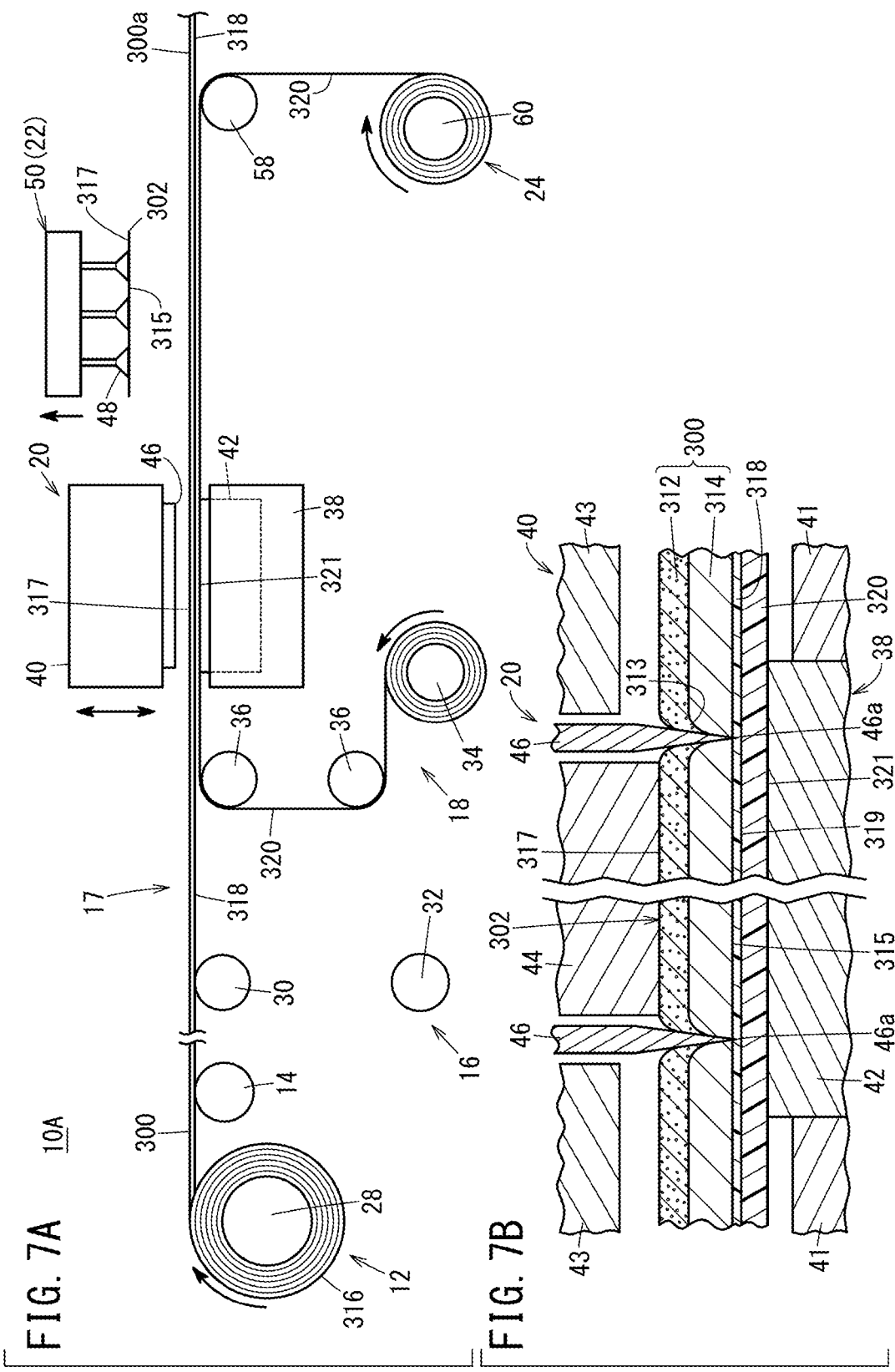
FIG. 7A is an explanatory diagram of a third driving mode.
FIG. 7B is a partially omitted cross-sectional view showing a state in which a sheet body is being cut in the third driving mode.

As shown in FIG. 1, FIG. 6A, and FIG. 7A, the downstream side winding unit 24 is configured to wind at least one of the back sheet 320 and the protective film 318, on a downstream side from the cutting device 20 in the conveyance path 17 of the sheet body 300. The downstream side winding unit 24 includes a peeling roller 58 for peeling off at least one of the back sheet 320 and the protective film 318 from a sheet residual material 300a after having cut and taken out the electrode sheets 302, and a winding roller 60 around which at least one of the back sheet 320 and the protective film 318 having been peeled off by the peeling roller 58 is wound.

As shown in FIG. 1, the control unit 26 is a computation device containing a microcomputer, and includes a CPU (central processing unit), and a ROM and a RAM as memories. The CPU functions as various function realizing units (function realizing means) by reading and executing programs stored in the ROM. The various function realizing units can also be constituted by function realizing devices in the form of hardware.

The control unit 26 comprises a product type registration unit 62, a product type specifying unit 63, a mode setting unit 64, a feeding and winding control unit 66, a cutting control unit 68, and an unloading control unit 70. The product type registration unit 62 registers product type information (information related to the type) of the sheet body 300. The product type specifying unit 63 specifies the product type of the sheet body 300. As product type information for the sheet body 300, there may be cited, for example, a constituent material of the support layer 312, a thickness of the support layer 312, a constituent material of the active layer 314, a thickness of the active layer 314, and the like.

The mode setting unit 64 sets one of a first driving mode, a second driving mode, and a third driving mode on the basis of the information registered in the product type registration unit 62. The feeding and winding control unit 66 controls driving of each of the sheet body feeding unit 12, the upstream side winding unit 16, the back sheet feeding unit 18, and the downstream side winding unit 24. The cutting control unit 68 controls driving of the cutting device 20. The unloading control unit 70 controls driving of the unloading device 22 (the suction device 50 and the conveyor device 52).

Next, a description will be given concerning the method of manufacturing the electrode sheet 302.

First, in preparation for starting manufacturing of the electrode sheets 302, the product type registration unit 62 registers, in the control unit 26, correspondence information in which the product type information of the sheet body 300 is associated with the first to third driving modes. Alternatively, the product type registration unit 62 registers predetermined product type information (materials, dimensions, etc.) in the control unit 26, and the control unit 26 specifies (determines) an optimum mode on the basis of the registered product type information, and automatically associates the product type with the mode.

Figure 3:
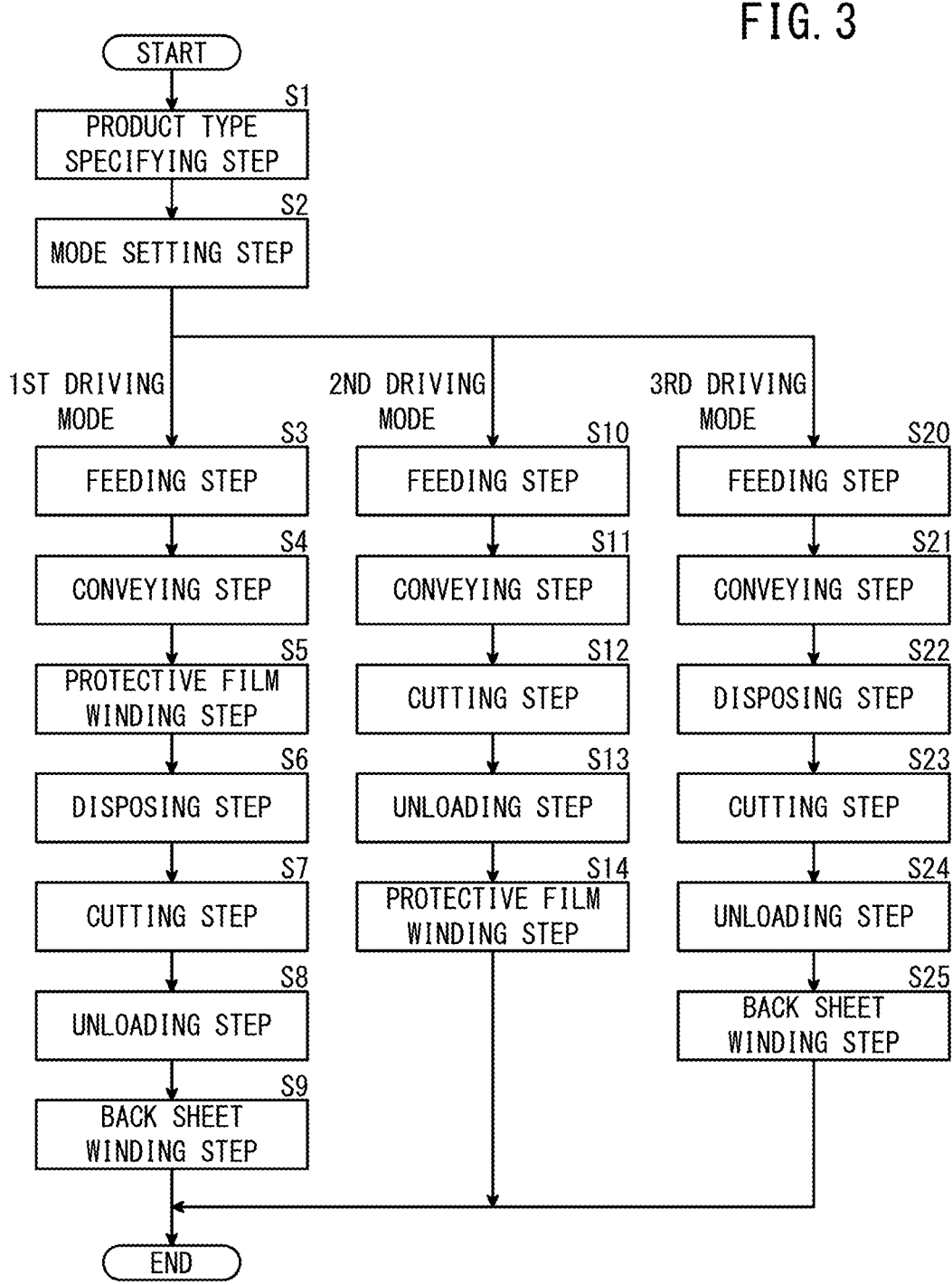
FIG. 3 is a flowchart for describing a method of manufacturing an electrode sheet using the manufacturing apparatus shown in FIG. 1.

Then, in step S1 (product type specifying step) of FIG. 3, the product type specifying unit 63 specifies the product type of the sheet body 300. More specifically, for example, a unique identifier (such as a barcode) attached to the sheet body 300 is read by a non-illustrated scanner provided in the control unit 26. In addition, the product type specifying unit 63 specifies the product type of the sheet body 300 based on the information that was read. Alternatively, using an interface, a user selects a specified product type from a registered product type list.

Next, in step S2 (mode setting step), the mode setting unit 64 sets one of the first driving mode, the second driving mode, and the third driving mode, on the basis of the product type that is specified by the product type specifying step, and the correspondence information that is registered by the product type registration unit 62.

In the case that the first driving mode is set in step S2, as shown in FIG. 1 and FIG. 4, the feeding and winding control unit 66 drives the sheet body feeding unit 12, the upstream side winding unit 16, the back sheet feeding unit 18, and the downstream side winding unit 24.

More specifically, as shown in FIG. 1, FIG. 3, and FIG. 4, in step S3 (feeding step), the feeding and winding control unit 66 rotates the feeding roller 28 of the sheet body feeding unit 12, whereby the sheet body 300 and the protective film 318 are integrally fed from the roll 316 (see FIG. 5A).

Then, in step S4 (conveying step), the sheet body 300, which is fed out in the feeding step, is conveyed while the protective film 318 is placed in contact with the active surface 315 of the active layer 314 on the side opposite from the support layer 312, together with the protective film 318 being supported by the conveying roller 14 (see FIG. 5A).

Thereafter, in step S5 (protective film winding step), the protective film 318 is wound by the upstream side winding unit 16 on an upstream side from the cutting blade 46 in the conveyance path 17 of the sheet body 300. More specifically, the feeding and winding control unit 66 rotates the winding roller 32 of the upstream side winding unit 16. Upon doing so, the protective film 318 that was peeled off from the sheet body 300 by the peeling roller 30 is wound on the winding roller 32.

In addition, in step S6 (disposing step), the back sheet 320 is disposed on the active surface 315 on an upstream side from the cutting blade 46 (between the peeling roller 30 and the cutting blade 46) in the conveyance path 17 of the sheet body 300. More specifically, the feeding and winding control unit 66 rotates the unwinding roller 34 of the back sheet feeding unit 18. Upon doing so, the back sheet 320 that is fed out from the unwinding roller 34 is disposed on the active surface 315 of the sheet body 300 via the lead-out rollers 36.

Next, in step S7 (cutting step), as shown in FIG. 5B, the sheet body 300 is cut in a state with the back sheet 320 being disposed on the active surface 315, together with an outer surface 321 of the back sheet 320 on a side opposite from the active surface 315 being supported by the support base 42. Moreover, in the cutting step, the feeding and winding control unit 66 temporarily stops driving of each of the sheet body feeding unit 12, the upstream side winding unit 16, the back sheet feeding unit 18, and the downstream side winding unit 24.

More specifically, in the cutting step, the cutting control unit 68 causes the upper die 40 to descend. Upon doing so, the pad 44 presses the outer surface 317 of the support layer 312 downward, whereby the sheet body 300 and the back sheet 320 are retained with respect to the support base 42. In addition, the cutting blade 46 is pressed against the sheet body 300 from the side of the support layer 312, whereby the sheet body 300 is punched, and the electrode sheet 302 is formed.

Moreover, when the upper die 40 is positioned at a lowermost end, the cutting edge 46a of the cutting blade 46 is located inside the back sheet 320 (at an internal portion in the thickness direction, the same applies hereinafter), and does not reach to the support base 42. More specifically, the back sheet 320 is cut halfway by the cutting blade 46. At this time, in the case that burrs 313 are generated in the support layer 312 which contains carbon fibers, the burrs 313 are positioned in the interior of the active layer 314. Stated otherwise, the burrs 313 do not protrude outwardly of the electrode sheet 302.

Thereafter, the upper die 40 is raised to a predetermined position (initial position). Consequently, the cutting blade 46 is separated upwardly with respect to the sheet body 300.

After completion of the cutting process, as shown in FIG. 1 and FIG. 4, the feeding and winding control unit 66 once again drives each of the sheet body feeding unit 12, the upstream side winding unit 16, the back sheet feeding unit 18, and the downstream side winding unit 24. Therefore, the electrode sheet 302 that was formed by the cutting process is conveyed to the position of the unloading device 22 (suction device 50) on the downstream side from the cutting blade 46, in a state of being placed on the back sheet 320 together with the sheet residual material 300a.

Thereafter, as shown in FIG. 1, FIG. 3, and FIG. 4, in step S8 (unloading step), the unloading device 22 performs unloading in a state with the outer surface 317 of the support layer 312 on the side opposite from the active layer 314 being retained. More specifically, as shown in FIG. 1, the unloading control unit 70 drives the suction device 50, whereby the electrode sheet 302 is lifted up and transported to the conveyor device 52, in a state with the plurality of suction units 48 being attracted under suction to the outer surface 317 of the support layer 312. At this time, the suction device 50 inverts the electrode sheet 302 vertically, in a manner so that the active surface 315 faces upwardly, together with the plurality of suction units 48 being positioned below the electrode sheet 302.

Then, the outer surface 317 of the support layer 312 is placed on the pair of belt units 56. At this time, since the pair of belt units 56 are located in spaces (gaps) between the suction units 48 that lie adjacent to each other, the suction device 50 and the conveyor device 52 do not interfere with each other. Further, the unloading control unit 70 drives the conveyor device 52, whereby the electrode sheet 302 having been placed on the belt units 56 is conveyed to a subsequent process step.

Continuing, in step S9 (back sheet winding step), the back sheet 320 is wound by the downstream side winding unit 24 on the downstream side from the unloading device 22 (suction device 50) in the conveyance path 17 of the sheet body 300. More specifically, the feeding and winding control unit 66 rotates the winding roller 60 of the downstream side winding unit 24.

Upon doing so, the back sheet 320 that was peeled off from the sheet residual material 300a by the peeling roller 58 is wound on the winding roller 60. Moreover, since the back sheet 320 that is wound and taken up by the downstream side winding unit 24 was placed in direct contact with the active surface 315, the back sheet 320 is discarded with each single use thereof, from the standpoint of preventing contamination to the back sheet 320 from the catalyst or the like. The sheet residual material 300a is conveyed further downstream from the downstream side winding unit 24 and is discarded. Moreover, in the first driving mode, the back sheet 320 may also be discarded together with the sheet residual material 300a, without the back sheet 320 being wound and taken up by the downstream side winding unit 24. In accordance therewith, the series of the operation flow (first driving mode) is brought to an end.

As shown in FIG. 3 and FIG. 6A, in the case that the second driving mode is set in step S2, the feeding and winding control unit 66 drives the sheet body feeding unit 12 and the downstream side winding unit 24, and stops driving of the upstream side winding unit 16 and the back sheet feeding unit 18.

More specifically, step S10 (feeding step) and step S11 (conveying step) are performed. Step S10 is the same as step S3, and step S11 is the same as step S4. Therefore, descriptions of step S10 and step S11 are omitted.

After completion of step S11, in step S12 (cutting step), as shown in FIG. 6B, the sheet body 300 is cut in a state with the protective film 318 being disposed on the active surface 315, together with an outer surface 319 of the protective film 318 on the side opposite from the active surface 315 being supported by the support base 42. Moreover, in the cutting step, the feeding and winding control unit 66 temporarily stops driving of each of the sheet body feeding unit 12 and the downstream side winding unit 24.

In the cutting step, the cutting control unit 68 causes the upper die 40 to descend. Upon doing so, the pad 44 presses the outer surface 317 of the support layer 312 downward, whereby the sheet body 300 and the protective film 318 are retained with respect to the support base 42. In addition, the cutting blade 46 is pressed against the sheet body 300 from the side of the support layer 312, whereby the sheet body 300 is punched, and the electrode sheet 302 is formed.

Moreover, when the upper die 40 is positioned at a lowermost end, the cutting edge 46a of the cutting blade 46 is located inside the protective film 318, and does not reach to the support base 42. More specifically, the protective film 318 is cut halfway by the cutting blade 46. At this time, in the case that burrs 313 are generated in the support layer 312 which contains carbon fibers, the burrs 313 are positioned in the interior of the active layer 314. Stated otherwise, the burrs 313 do not protrude outwardly of the electrode sheet 302.

Thereafter, the upper die 40 is raised to a predetermined position (initial position). Consequently, the cutting blade 46 is separated upwardly with respect to the sheet body 300.

After completion of the cutting process, as shown in FIG. 6A, the feeding and winding control unit 66 once again drives each of the sheet body feeding unit 12 and the downstream side winding unit 24. Therefore, the electrode sheet 302 that was formed by the cutting process is conveyed to the position of the unloading device 22 (suction device 50) on the downstream side from the cutting blade 46, in a state of being placed on the protective film 318 together with the sheet residual material 300a.

Thereafter, as shown in FIG. 3 and FIG. 6A, step S13 (unloading step) is performed. Step S13 is the same as step S8 mentioned above, and therefore, description of this step is omitted.

Then, in step S14 (protective film winding step), the protective film 318 is wound by the downstream side winding unit 24 on the downstream side from the unloading device 22 (suction device 50) in the conveyance path 17 of the sheet body 300. More specifically, the feeding and winding control unit 66 rotates the winding roller 60 of the downstream side winding unit 24.

Upon doing so, the protective film 318 that was peeled off from the sheet residual material 300a by the peeling roller 58 is wound on the winding roller 60. The sheet residual material 300a is conveyed further downstream from the downstream side winding unit 24 and is discarded. In accordance therewith, the series of the operation flow (second driving mode) is brought to an end. However, in the second driving mode, the protective film 318 may also be discarded together with the sheet residual material 300a, without the protective film 318 being wound and taken up by the downstream side winding unit 24.

As shown in FIG. 3 and FIG. 7A, in the case that the third driving mode is set in step S2, the feeding and winding control unit 66 drives the sheet body feeding unit 12, the back sheet feeding unit 18, and the downstream side winding unit 24, and stops driving of the upstream side winding unit 16.

More specifically, step S20 (feeding step) and step S21 (conveying step) are performed. Step S20 is the same as step S3, and step S21 is the same as step S4. Therefore, descriptions of step S20 and step S21 are omitted.

After completion of step S21, in step S22 (disposing step), the back sheet 320 is disposed on the outer surface 319 of the protective film 318 on an upstream side from the cutting blade 46 in the conveyance path 17 of the sheet body 300. More specifically, the feeding and winding control unit 66 rotates the unwinding roller 34 of the back sheet feeding unit 18. Upon doing so, the back sheet 320 that is fed out from the unwinding roller 34 is disposed on the outer surface 319 of the protective film 318 via the lead-out rollers 36.

Next, in step S23 (cutting step), as shown in FIG. 7B, the sheet body 300 is cut in a state with the protective film 318 being disposed between the back sheet 320 and the sheet body 300, together with the outer surface 321 of the back sheet 320 on a side opposite from the protective film 318 being supported by the support base 42. Moreover, in the cutting step, the feeding and winding control unit 66 temporarily stops driving of each of the sheet body feeding unit 12, the back sheet feeding unit 18, and the downstream side winding unit 24.

In the cutting step, the cutting control unit 68 causes the upper die 40 to descend. Upon doing so, the pad 44 presses the outer surface 317 of the support layer 312 downward, whereby the sheet body 300, the protective film 318, and the back sheet 320 are retained with respect to the support base 42. In addition, the cutting blade 46 is pressed against the sheet body 300 from the side of the support layer 312, whereby the sheet body 300 is punched, and the electrode sheet 302 is formed. Moreover, when the upper die 40 is positioned at a lowermost end, the cutting edge 46a of the cutting blade 46 is located inside the protective film 318 or inside the back sheet 320, and does not reach to the support base 42.

More specifically, in the case that a portion of the cutting blade 46 penetrates through the protective film 318, the cutting edge 46a of the portion of the cutting blade 46 that has penetrated through the protective film 318 becomes positioned in the interior of the back sheet 320. At this time, the protective film 318 is not cut peripherally by the cutting blade 46. Stated otherwise, the protective film 318 is not punched by the cutting blade 46.

Further, in the cutting process, as shown in FIG. 7A, in the case that burrs 313 are generated in the support layer 312 which contains carbon fibers, the burrs 313 are positioned in the interior of the active layer 314. Stated otherwise, the burrs 313 do not protrude outwardly of the electrode sheet 302.

Thereafter, the upper die 40 is raised to a predetermined position (initial position). Consequently, the cutting blade 46 is separated upwardly with respect to the sheet body 300.

After completion of the cutting process, the feeding and winding control unit 66 once again drives each of the sheet body feeding unit 12, the back sheet feeding unit 18, and the downstream side winding unit 24. Therefore, the electrode sheet 302 that was formed by the cutting process is conveyed to the position of the unloading device 22 (suction device 50) on the downstream side from the cutting blade 46, in a state of being placed on the protective film 318 together with the sheet residual material 300a.

Thereafter, as shown in FIG. 3 and FIG. 7A, step S24 (unloading step) is performed. Step S24 is the same as step S8 mentioned above, and therefore, description of this step is omitted.

In addition, in step S25 (back sheet winding step), the back sheet 320 is wound by the downstream side winding unit 24 on the downstream side from the unloading device 22 (suction device 50) in the conveyance path 17 of the sheet body 300. More specifically, the feeding and winding control unit 66 rotates the winding roller 60 of the downstream side winding unit 24.

Upon doing so, the back sheet 320 that was peeled off from the protective film 318 by the peeling roller 58 is wound on the winding roller 60. Moreover, in the third driving mode, since the back sheet 320 is not in direct contact with the active surface 315, there is no concern over contamination to the back sheet 320 from the catalyst or the like. Also, the presence of the protective film 318 at the time of the cutting process causes relatively little damage to the back sheet 320 by the cutting blade 46. Therefore, the back sheet 320 that is wound and taken up by the downstream side winding unit 24 is discarded after having been reused one or more times. The sheet residual material 300a and the protective film 318 are conveyed further downstream from the downstream side winding unit 24 and are discarded. In accordance therewith, the series of the operation flow (third driving mode) is brought to an end.

The manufacturing apparatus 10A for manufacturing the electrode sheet 302 and the method of manufacturing the electrode sheet 302 exhibit the following advantageous effects.

According to the present embodiment, the cutting blade 46 is pressed against the sheet body 300 from the side of the support layer 312, whereby the sheet body 300 is punched, and the electrode sheet 302 is formed. Stated otherwise, as shown in FIG. 8A, the cutting edge 46a of the cutting blade 46 is pressed into the outer surface 317 of the support layer 312. Upon doing so, the active layer 314 is placed in a state of being pressed by the support layer 312.

Additionally, as shown in FIG. 8B, when the cutting blade 46 is further pressed into the support layer 312, while the cutting blade 46 penetrates through the support layer 312 together with the support layer 312 being pressed and spread out in the thickness direction of the cutting blade 46 (in the planar direction of the support layer 312), the cutting edge of the cutting blade 46 also enters into the active layer 314.

Next, as shown in FIG. 8C, when the cutting blade 46 is pressed into the active layer 314, a portion of the support layer 312 separates away from the cutting blade 46. Accompanying separation of the portion of the support layer 312 from the cutting blade 46, a tensile stress is generated on a portion of the active layer 314 that is pressed by the cutting blade 46, in a direction that intersects with the pressing direction of the cutting blade 46.

Thereafter, as shown in FIG. 8D, the cutting edge 46a of the cutting blade 46 reaches to the interior of the back sheet 320 or the protective film 318, whereby the active layer 314 is completely cut. Consequently, since chipping of the active layer 314 can be suppressed due to the occurrence of tensile stress in the active layer 314 during cutting of the sheet body 300, cutting of the active layer 314 can be performed easily and with high quality.

Further, since the cutting blade 46 is pressed from the side of the support layer 312, even if burrs 313 occur in the support layer 312 at the time of cutting, the burrs 313 can be positioned within the active layer 314. Thus, even if such burrs 313 occur, the burrs 313 can be prevented from protruding outwardly of the electrode sheet 302.

In the method of manufacturing the electrode sheet 302, the conveying step is performed in which the sheet body 300, which is fed out in the feeding step, is conveyed while the protective film 318 is placed in contact with the active surface 315 of the active layer 314 on the side opposite from the support layer 312, together with the protective film 318 being supported by the conveying roller 14.

According to such a method, since the protective film 318 can prevent the active surface 315 from coming into direct contact with the conveying roller 14, it is possible to prevent portions of the active layer 314 from falling off and becoming adhered to the conveying roller 14. Consequently, while suppressing the amount of work required to clean the conveying roller 14, a plurality of types of electrode sheets 302 (for example, the anode side electrode sheet 302a and the cathode side electrode sheet 302b) having active layers 314 made of components that differ from each other can be manufactured with one manufacturing apparatus 10A. Thus, it is possible to enhance the productivity of the electrode sheets 302.

Further, when a plurality of types of electrode sheets 302 (the electrode sheets 302a and 302b) are manufactured in common using one manufacturing apparatus 10A, it is possible to prevent so-called contamination, in which different components become mixed within the active layer 314, from occurring. Accordingly, the performance and yield of the electrode sheets 302 can be improved.

The roll 316 is formed by winding the protective film 318 and the sheet body 300 in a state with the protective film 318 being disposed on the active surface 315. In the feeding step, the sheet body 300 is fed out in a state with the protective film 318 being disposed on the active surface 315. Further, the manufacturing apparatus 10A is equipped with the conveying roller 14 that conveys the sheet body 300 that was fed out from the roll 316 in a state with the protective film 318 being supported.

In accordance with these features, since the sheet body 300 is not in direct contact with the conveying roller 14, portions of the active layer 314 are prevented from falling off and becoming adhered to the conveying roller 14, and it is possible to prevent the occurrence of breaks or chips in the active layer 314 due to contact with the conveying roller 14.

In the method of manufacturing the electrode sheet 302, there are performed a protective film winding step of winding and taking up the protective film 318 on an upstream side from the cutting blade 46 in the conveyance path 17 of the sheet body 300, and a disposing step of, after completion of the protective film winding step, disposing the back sheet 320 on the active surface 315, on the upstream side from the cutting blade 46 in the conveyance path 17 (see FIG. 4). In the cutting step (step S7 of the first driving mode), the sheet body 300 is cut in a state with the back sheet 320 being disposed on the active surface 315, together with the outer surface 321 of the back sheet 320 on a side opposite from the active surface 315 being supported by the support base 42 (see FIG. 3 and FIG. 5B).

Further, the electrode sheet manufacturing apparatus 10A is equipped with the upstream side winding unit 16 that is configured to wind the protective film 318 on the upstream side from the cutting device 20 in the conveyance path 17 of the sheet body 300, and the back sheet feeding unit 18 which feeds out the back sheet 320 to the active surface 315 between the upstream side winding unit 16 and the cutting device 20 in the conveyance path 17. The cutting device 20 includes the support base 42 which supports the outer surface 321 of the back sheet 320 on the side opposite from the active surface 315 when the sheet body 300 is cut.

In accordance with these features, by allowing the cutting blade 46 to reach to the back sheet 320, the sheet body 300 can be reliably cut. Further, since the back sheet 320 is capable of preventing the cutting blade 46 from coming into direct contact with the support base 42, damage to the cutting blade 46 can be suppressed.

In the cutting step (step S12 of the second driving mode), the sheet body 300 is cut in a state with the protective film 318 being disposed on the active surface 315, together with the outer surface 319 of the protective film 318 on a side opposite from the active surface 315 being supported by the support base 42 (see FIG. 3 and FIG. 6B).

Further, the cutting device 20 includes the support base 42 which supports the outer surface 319 of the protective film 318 on the side opposite from the active surface 315 when the sheet body 300 is cut.

In accordance with these features, by allowing the cutting blade 46 to reach to the protective film 318, the sheet body 300 can be reliably cut. Further, since the protective film 318 is capable of preventing the cutting blade 46 from coming into direct contact with the support base 42, damage to the cutting blade 46 can be suppressed. Furthermore, since there is no need for the back sheet 320 or the like to be disposed between the protective film 318 and the support base 42, manufacturing costs for the electrode sheet 302 can be reduced. Still further, after the sheet body 300 has been cut, the protective film 318 can be recovered in an efficient manner by the downstream side winding unit 24.

In the method of manufacturing the electrode sheet 302, the disposing step (see FIG. 7A) is performed in which the back sheet 320 is disposed on the outer surface 319 of the protective film 318 on the side opposite from the sheet body 300, on an upstream side from the cutting blade 46 in the conveyance path 17 of the sheet body 300. In the cutting step (step S23 of the third driving mode), the sheet body 300 is cut in a state with the protective film 318 being disposed between the back sheet 320 and the sheet body 300, together with the outer surface 321 of the back sheet 320 on a side opposite from the protective film 318 being supported by the support base 42 (see FIG. 3 and FIG. 7B).

Further, the manufacturing apparatus 10A is equipped with the back sheet feeding unit 18 which feeds out the back sheet 320 to the outer surface 319 of the protective film 318 on the side opposite from the sheet body 300, on the upstream side from the cutting device 20 in the conveyance path 17 of the sheet body 300. The cutting device 20 includes the support base 42 that supports the outer surface 321 of the back sheet 320 on the side opposite from the sheet body 300, in a manner so that the protective film 318 is disposed between the back sheet 320 and the sheet body 300 when the sheet body 300 is cut.

In accordance with these features, by allowing the cutting blade 46 to reach to the protective film 318, the sheet body 300 can be reliably cut. In addition, assuming that the cutting blade 46 remains at a depth so as to halfway cut the protective film 318, the cutting blade 46 does not reach to the back sheet 320. Alternatively, even if the cutting blade 46 reaches to the back sheet 320, it remains just at the surface layer thereof.

Therefore, the back sheet 320 can be used repeatedly. Furthermore, even in the case that the surface layer of the back sheet 320 is cut by the cutting blade 46, since the cutting blade 46 does not reach to the support base 42, damage to the cutting blade 46 can be suppressed more reliably.

In the method of manufacturing the electrode sheet 302, after completion of the cutting step, the unloading step is performed of unloading the electrode sheet 302, in a state in which the outer surface 317 of the support layer 312 on the side opposite from the active layer 314 is retained by the unloading device 22. Further, the manufacturing apparatus 10A is equipped with the unloading device 22 that retains the outer surface 317 of the support layer 312 on the side opposite from the active layer 314, and unloads the electrode sheet 302. Consequently, the electrode sheet 302 can be unloaded without contacting the active surface 315.

The electrode sheet 302 is an electrode sheet 302 for use with the fuel cell 304, and carbon fibers are contained in the support layer 312. Consequently, along with the effects described above, it is possible to prevent breaking or chipping of the active layer 314, and to obtain the electrode sheet 302 for use with the fuel cell 304 which is high in product quality.

The manufacturing apparatus 10A includes the downstream side winding unit 24 which is configured to wind the back sheet 320 on the downstream side from the cutting device 20 in the conveyance path 17. In accordance with this feature, after the sheet body 300 has been cut, the back sheet 320 can be recovered in an efficient manner by the downstream side winding unit 24 and reused.

The electrode sheet manufacturing apparatus 10A is equipped with the upstream side winding unit 16 that is configured to wind the protective film 318 on the upstream side from the cutting device 20 in the conveyance path 17 of the sheet body 300, the back sheet feeding unit 18 that is configured to feed out the back sheet 320 to the active surface 315 between the upstream side winding unit 16 and the cutting device 20 in the conveyance path 17, and the downstream side winding unit 24 that is configured to wind at least one of the back sheet 320 and the protective film 318 on the downstream side from the cutting device 20 in the conveyance path 17.

The manufacturing apparatus 10A is also equipped with the product type registration unit 62 that registers the product type information of the sheet body 300, the mode setting unit 64 that sets any one of the first driving mode, the second driving mode, and the third driving mode on the basis of the product type information registered by the product type registration unit 62, and the feeding and winding control unit 66 which controls driving of the sheet body feeding unit 12, the upstream side winding unit 16, the back sheet feeding unit 18, and the downstream side winding unit 24 on the basis of the mode set by the mode setting unit 64.

In the first driving mode, the sheet body feeding unit 12, the upstream side winding unit 16, the back sheet feeding unit 18, and the downstream side winding unit 24 are driven. In the second driving mode, the sheet body feeding unit 12 and the downstream side winding unit 24 are driven, together with driving of the upstream side winding unit 16 and the back sheet feeding unit 18 being stopped. In the third driving mode, the sheet body feeding unit 12, the back sheet feeding unit 18, and the downstream side winding unit 24 are driven, together with driving of the upstream side winding unit 16 being stopped.

In accordance with these features, three driving modes (the first driving mode, the second driving mode, and the third driving mode) can be implemented by a single manufacturing apparatus 10A. Therefore, since there is no need to prepare dedicated manufacturing apparatuses for separately implementing the three driving modes, the cost of the manufacturing apparatus 10A can be reduced.

The manufacturing apparatus 10A is equipped with the product type specifying unit 63 that specifies the product type of the sheet body 300. The product type registration unit 62 registers correspondence information in which the first driving mode, the second driving mode, and the third driving mode are associated with the product type information. The mode setting unit 64 sets any one of the first driving mode, the second driving mode, and the third driving mode, on the basis of the product type that is specified by the product type specifying unit 63, and the correspondence information that is registered by the product type registration unit 62.

Consequently, one of the first to third driving modes can be easily set in accordance with the product type of the sheet body 300.

Second Embodiment

Next, a manufacturing apparatus 10B for manufacturing the electrode sheet 302 and a method of manufacturing the electrode sheet 302 according to a second embodiment of the present invention will be described. In the manufacturing apparatus 10B for manufacturing the electrode sheet 302 according to the second embodiment, the same reference characters are used to designate the same constituent elements as those described in connection with the above-described first embodiment, and detailed description of such features is omitted.

Further, in the method of manufacturing the electrode sheet 302 according to the second embodiment, descriptions concerning steps which are the same as steps that have already been described in connection with the aforementioned first embodiment will be omitted. Furthermore, in the present embodiment, the same operations and effects are realized in relation to the same constituent elements and steps as those constituent elements and steps described in connection with the first embodiment. A similar treatment applies to the third and fourth embodiments, to be described later.

As shown in FIG. 9A, the manufacturing apparatus 10B is equipped with a downstream side winding unit 24a instead of the downstream side winding unit 24. The downstream side winding unit 24a includes a first peeling roller 72, a first winding roller 74, a second peeling roller 76, and a second winding roller 78.

The first peeling roller 72 peels the back sheet 320 from the protective film 318. The first winding roller 74 winds and takes up the back sheet 320 that was peeled off by the first peeling roller 72. The second peeling roller 76 is positioned on a downstream side from the first peeling roller 72 in the conveyance path 17 of the sheet body 300, and peels the protective film 318 from the sheet residual material 300a. The second winding roller 78 winds and takes up the protective film 318 that was peeled off by the second peeling roller 76.

In the manufacturing method in which the manufacturing apparatus 10B is used, in step S25 (back sheet winding step) of FIG. 3 in the third driving mode, the feeding and winding control unit 66 rotates the first winding roller 74 of the downstream side winding unit 24a, thereby winding onto the first winding roller 74 the back sheet 320 that was peeled off from the protective film 318 by the first peeling roller 72. Further, the feeding and winding control unit 66 rotates the second winding roller 78 of the downstream side winding unit 24a, thereby winding onto the second winding roller 78 the protective film 318 that was peeled off from the sheet residual material 300a by the second peeling roller 76 (protective film winding step). In this case, the protective film 318 can be recovered in an efficient manner by the second winding roller 78.

Third Embodiment

Next, a manufacturing apparatus 10C for manufacturing the electrode sheet 302 and a method of manufacturing the electrode sheet 302 according to a third embodiment of the present invention will be described.

As shown in FIG. 9B, in the manufacturing apparatus 10C, the upstream side winding unit 16 and the back sheet feeding unit 18 which were described above are omitted. Stated otherwise, in the method of manufacturing in which the manufacturing apparatus 10C is used, only the above-described second driving mode is carried out. In this case, since there is no need to provide the upstream side winding unit 16 and the back sheet feeding unit 18, the configuration of the manufacturing apparatus 10C can be simplified, as compared with the manufacturing apparatus 10A according to the first embodiment.

In the manufacturing apparatus 10C, the downstream side winding unit 24 may additionally be omitted. In this case, the configuration of the manufacturing apparatus 10C can be further simplified. Moreover, on the downstream side from the cutting blade 46 in the conveyance path 17 of the sheet body 300, the protective film 318 is discarded together with the sheet residual material 300a.

Fourth Embodiment

Next, a manufacturing apparatus 10D for manufacturing the electrode sheet 302 and a method of manufacturing the electrode sheet 302 according to a fourth embodiment of the present invention will be described.

As shown in FIG. 10, in the manufacturing apparatus 10D, the above-described upstream side winding unit 16 is omitted. Stated otherwise, in the method of manufacturing in which the manufacturing apparatus 10D is used, only the above-described third driving mode is carried out. In this case, since there is no need to provide the upstream side winding unit 16, the configuration of the manufacturing apparatus 10D can be simplified, as compared with the manufacturing apparatus 10A according to the first embodiment.

The manufacturing apparatus 10D may be equipped with the downstream side winding unit 24a that is illustrated in FIG. 9A instead of the downstream side winding unit 24.

Other Embodiments

As described above, embodiments have been exemplified in which, in the manufacturing apparatus and the method of manufacturing an electrode sheet according to the present invention, the first to third driving modes are set, and selection of one of such modes is carried out. However, in order to realize the present invention, at least one of the first to third driving modes may be implemented.

The method of manufacturing an electrode sheet and the electrode sheet manufacturing apparatus according to the present invention are not limited to the embodiments described above, and it goes without saying that various additional or modified configurations could be adopted therein without departing from the essence and gist of the present invention as set forth in the appended claims.

What is claimed is:

1. A method of manufacturing an electrode sheet, comprising:
    a feeding step of feeding out a sheet body from a roll on which the sheet body is wound, the sheet body including an active layer containing a catalyst laminated on a support layer;
    a disposing step, following the feeding step, of disposing a back sheet on an outer surface on an active surface of the active layer; and
    a cutting step, following the disposing step, of forming the electrode sheet by punching the sheet body by pressing a cutting blade from a side of the support layer against the sheet body that was fed out in the feeding step so that when the sheet body is punched by the cutting blade, the support layer and the active layer are cut in order of first the support layer and then the active layer from a side of the support layer, wherein the cutting blade, when cutting the sheet body, reaches inside the back sheet without passing completely through the back sheet so as to not cut through the back sheet,
    wherein the disposing step is performed an upstream side from the cutting blade in a conveyance path of the sheet body.

2. The method of manufacturing the electrode sheet according to claim 1, further comprising a conveying step of conveying the sheet body that was fed out in the feeding step while a protective film is placed in contact with the active surface, together with the protective film being supported by a conveying roller.

3. The method of manufacturing the electrode sheet according to claim 2, wherein:
the roll is formed by the protective film and the sheet body being wound in a state with the protective film being disposed on the active surface; and
in the feeding step, the sheet body is fed out in a state with the protective film being disposed on the active surface.

4. The method of manufacturing the electrode sheet according to claim 2, further comprising:
a protective film winding step of winding the protective film on the upstream side from the cutting blade in the conveyance path of the sheet body,
wherein the disposing step is performed after completion of the protective film winding step,
wherein, in the cutting step, the sheet body is cut in a state with the back sheet being disposed on the active surface, together with an outer surface of the back sheet on a side opposite from the active surface being supported by a support base.

5. The method of manufacturing the electrode sheet according to claim 2, wherein, in the cutting step, the sheet body is cut in a state with the protective film being disposed on the active surface, together with an outer surface of the protective film on a side opposite from the active surface being supported by a support base.

6. The method of manufacturing the electrode sheet according to claim 2, wherein:
in the disposing step, the back sheet is disposed on an outer surface of the protective film on a side opposite from the sheet body, and in the cutting step, the sheet body is cut in a state with the protective film being disposed between the back sheet and the sheet body, together with an outer surface of the back sheet on a side opposite from the protective film being supported by a support base.

7. The method of manufacturing the electrode sheet according to claim 1, further comprising, after completion of the cutting step, performing an unloading step of unloading the electrode sheet in a state in which an outer surface of the support layer on a side opposite from the active layer is retained by an unloading device.

8. The method of manufacturing the electrode sheet according to claim 1, wherein the electrode sheet is an electrode sheet for use with a fuel cell, and carbon fibers are contained in the support layer.

9. An electrode sheet manufacturing apparatus, comprising:
a sheet body feeding unit configured to feed out a sheet body from a roll on which the sheet body is wound, the sheet body including an active layer containing a catalyst laminated on a support layer;
a cutting device including a cutting blade configured to form the electrode sheet by punching the sheet body that was fed out from the roll by the sheet body feeding unit; and
a back sheet feeding unit configured to feed out a back sheet to an active surface of the active layer between the sheet body feeding unit and the cutting device in a conveyance path of the sheet body,
wherein, in a state prior to cutting the sheet body, the cutting blade is disposed so as to face an outer surface of the support layer on a side opposite from the active layer so that when the sheet body is punched, the support layer and the active layer are cut in order of first the support layer and then the active layer from a side of the support layer, and
wherein the cutting device includes the cutting blade that, when the sheet body is cut, reaches inside the back sheet without passing completely through the back sheet so as to not cut through the back sheet.

10. The electrode sheet manufacturing apparatus according to claim 9, wherein:
the roll is formed by a protective film and the sheet body being wound in a state with the protective film being disposed on the active surface; and
further comprising a conveying roller configured to convey the sheet body that was fed out from the roll in a state with the protective film being supported.

11. The electrode sheet manufacturing apparatus according to claim 10, further comprising:
an upstream side winding unit configured to wind the protective film on an upstream side from the cutting device in the conveyance path of the sheet body,
wherein the back sheet feeding unit feeds out the back sheet to the active surface between the upstream side winding unit and the cutting device in the conveyance path, and
wherein the cutting device includes a support base configured to support an outer surface of the back sheet on a side opposite from the active surface when the sheet body is cut.

12. The electrode sheet manufacturing apparatus according to claim 10, wherein the cutting device includes a support base configured to support an outer surface of the protective film on a side opposite from the active surface when the sheet body is cut.

13. The electrode sheet manufacturing apparatus according to claim 10,
wherein the back sheet feeding unit feeds out the back sheet to an outer surface of the protective film on a side opposite from the sheet body, on an upstream side from the cutting device in the conveyance path of the sheet body, and
wherein the cutting device includes a support base configured to support an outer surface of the back sheet on a side opposite from the sheet body, in a manner so that the protective film is disposed between the back sheet and the sheet body when the sheet body is cut.

14. The electrode sheet manufacturing apparatus according to claim 13, further comprising a downstream side winding unit configured to wind the back sheet on a downstream side from the cutting device in the conveyance path.

15. The electrode sheet manufacturing apparatus according to claim 10, further comprising:
an upstream side winding unit configured to wind the protective film on an upstream side from the cutting device in the conveyance path of the sheet body;
a downstream side winding unit configured to wind at least one of the back sheet and the protective film on a downstream side from the cutting device in the conveyance path;
a product type registration unit configured to register product type information of the sheet body;
a mode setting unit configured to set any one of a first driving mode, a second driving mode, and a third driving mode, based on the product type information registered by the product type registration unit; and
a feeding and winding control unit configured to control driving of the sheet body feeding unit, the upstream side winding unit, the back sheet feeding unit, and the downstream side winding unit, based on the mode set by the mode setting unit;

wherein:

the back sheet feeding unit feeds out the back sheet toward the active surface between the upstream side winding unit and the cutting device in the conveyance path;

in the first driving mode, the sheet body feeding unit, the upstream side winding unit, the back sheet feeding unit, and the downstream side winding unit are driven;

in the second driving mode, the sheet body feeding unit and the downstream side winding unit are driven, together with driving of the upstream side winding unit and the back sheet feeding unit being stopped; and in the third driving mode, the sheet body feeding unit, the back sheet feeding unit, and the downstream side winding unit are driven, together with driving of the upstream side winding unit being stopped.

16. The electrode sheet manufacturing apparatus according to claim 15, further comprising:

a product type specifying unit configured to specify a product type of the sheet body;

wherein the product type registration unit registers correspondence information in which the first driving mode, the second driving mode, and the third driving mode are associated with the product type information; and the mode setting unit sets any one of the first driving mode, the second driving mode, and the third driving mode, based on the product type that is specified by the product type specifying unit, and the correspondence information that is registered by the product type registration unit.

17. The electrode sheet manufacturing apparatus according to claim 15, further comprising an unloading device configured to retain the outer surface of the support layer on the side opposite from the active layer, and to unload the electrode sheet.

* * * * *